(12) United States Patent
Wyse et al.

(10) Patent No.: US 8,644,787 B1
(45) Date of Patent: Feb. 4, 2014

(54) APPARATUS AND METHOD FOR FORMING MULTIPLE INDEPENDENT AND DYNAMICALLY ADAPTABLE INTERMEDIATE FREQUENCY SIGNALS

(75) Inventors: Russell D. Wyse, Center Point, IA (US); Mark A. Willi, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 801 days.

(21) Appl. No.: 12/796,980

(22) Filed: Jun. 9, 2010

(51) Int. Cl.
*H04B 1/26* (2006.01)

(52) U.S. Cl.
USPC ............ 455/323; 455/334; 455/326; 455/296

(58) Field of Classification Search
USPC .................................. 455/330, 323, 318, 319
See application file for complete search history.

(56) References Cited

U.S. PATENT DOCUMENTS

| | | | | |
|---|---|---|---|---|
| 5,343,499 A | * | 8/1994 | Jasper et al. | 375/261 |
| 5,361,409 A | * | 11/1994 | Vice | 455/326 |
| 5,513,390 A | * | 4/1996 | Vice | 455/323 |
| 5,551,074 A | * | 8/1996 | Vice | 455/326 |
| 5,553,319 A | * | 9/1996 | Tanbakuchi | 455/326 |
| 5,732,345 A | * | 3/1998 | Vice | 455/333 |
| 5,752,181 A | * | 5/1998 | Vice | 455/326 |
| 5,990,849 A | * | 11/1999 | Salvail et al. | 343/895 |
| 6,807,407 B2 | * | 10/2004 | Ji | 455/326 |
| 6,959,180 B2 | * | 10/2005 | Ji | 455/333 |
| 7,151,919 B2 | | 12/2006 | Takalo et al. | |
| 2002/0032016 A1 | * | 3/2002 | Ji | 455/326 |
| 2002/0049043 A1 | * | 4/2002 | Gamliel | 455/112 |
| 2009/0237314 A1 | * | 9/2009 | Lalezari | 343/721 |

FOREIGN PATENT DOCUMENTS

JP 57118406 A * 7/1982 ............... H03D 7/14

* cited by examiner

*Primary Examiner* — Lewis West
*Assistant Examiner* — Richard Chan
(74) *Attorney, Agent, or Firm* — Donna P. Suchy; Daniel M. Barbieri

(57) ABSTRACT

A method of separating individual channels from a composite or broadband RF signal that carries the channels on respective frequencies. An RF signal is received from an antenna at a high impedance input port of a plurality of mixers. A local oscillator (LO) signal is received at a high impedance port of the plurality of mixers. The plurality of mixers separately mix the RF signal to produce a plurality of common intermediate frequency (IF) signals. The plurality of common IF signals are output to filters corresponding to the individual isolated channels then processed to derive their information content.

9 Claims, 4 Drawing Sheets

APPARATUS AND METHOD FOR FORMING MULTIPLE INDEPENDENT AND DYNAMICALLY ADAPTABLE INTERMEDIATE FREQUENCY SIGNALS

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of contract No. FA8650-05-C-7214 awarded by the U.S. Air Force.

BACKGROUND

This invention relates to radio communications and more specifically to a radio frequency (RF) mixer circuit and method used in RF equipment.

RF communication equipment generally use mixers to convert a signal from a low frequency to a high frequency or a high frequency to a low frequency by mixing the signal with a local oscillator (LO) signal. The LO frequency can be above or below the frequency of a desired signal to produce a sum and a difference frequency one of which is the frequency of interest.

Mixer performance is critical to the overall performance of transmit and receive channels of RF equipment that employ mixers. It is especially critical in receiver applications where a broadband signal carrying numerous sub-channels are to be detected and processed. In such applications, multiple mixers serve to separate each sub-channel from a broadband composite signal for separate digital processing of the sub-channels.

SUMMARY

According to the present invention, there is provided a method of separating individual channels from a composite broadband RF signal that carries the channels on respective frequencies. An RF signal is received from an antenna at an impedance matched input port of a plurality of mixers. The impedance match of the plurality of mixers is independent of the bias state of the isolated paths, because each isolated path maintains its matched impedance regardless of its bias state. This offers flexibility in the number, and bias condition, of the mixer outputs without impacting the system. A local oscillator (LO) signal is received at a broadband impedance matched LO port of the plurality of mixers. The LO port maintains its broadband impedance, regardless of the number of mixers utilized. The plurality of mixers separately mix the broadband composite RF signal to produce a plurality of common isolated intermediate frequency (IF) signals on independent and isolated IF channels. The plurality of common IF signals are output to filters corresponding to the individual isolated channels, which are then processed to derive their information content.

In another embodiment, a method of separating the individual channels from the broadband composite RF signal is disclosed. The RF signal is received from the antenna at an input port of a mixer with a broadband matched RF input port that remains matched independent of the IF output channels' bias. A balanced LO signal is received at a broadband impedance matched LO port of the mixer that maintains its broadband impedance match independent of the RF input and IF output and across a broadband frequency range. The RF and LO signals are mixed in the mixer to produce the IF signal. A plurality of active IF baluns that provide reverse isolation and maintain large input port impedances independent of their bias state simultaneously split the IF signal via the input ports and produce a plurality of common IF signals corresponding to the individual and isolated channels. The individual channels are then processed to derive their information content.

Other features and aspects of the invention will become apparent upon review of the following description taken in connection with the accompanying drawings. The invention, though, is pointed out with particularity by the appended claims.

DESCRIPTION OF ILLUSTRATIVE EMBODIMENTS

Radio frequency (RF) mixers are often used for upconverting or downconverting an RF signal to a higher or lower frequency, such as, to produce an Intermediate frequency (IF) signal. The mixer may be used in both frequency conversion and frequency synthesis applications. There are many types of mixers, such as unbalanced, single and double balanced. Mixers can be passive diode or active transistor types and constructed with discrete components or use various fabrication technologies, including fabricated on a semiconductor substrate such as silicon (SI) substrate, silicon-germanium (Si—Ge) substrate, gallium-arsenide (GaAs) substrate, or gallium-nitride (GaN) on silicon substrate. Mixers may also comprise various transistor types, including bipolar terminal transistor (BJT), metallic oxide semiconductor (MOS), complementary metallic oxide semiconductor (CMOS), a bipolar CMOS (Bi-CMOS), heterojunction bipolar transistor (HBT), metal semiconductor field effect transistor (MESFET) and high electron mobility transistor (HEMT) design technologies.

The present invention is illustrated in the context of an RF receiver 100 implemented as an integrated circuit (IC). As one example of an application, RF receiver 100 can perform amplification, RF to intermediate frequency (IF) frequency conversion, and/or gain control functions in a wireless handset or base-station application.

Figure 1:
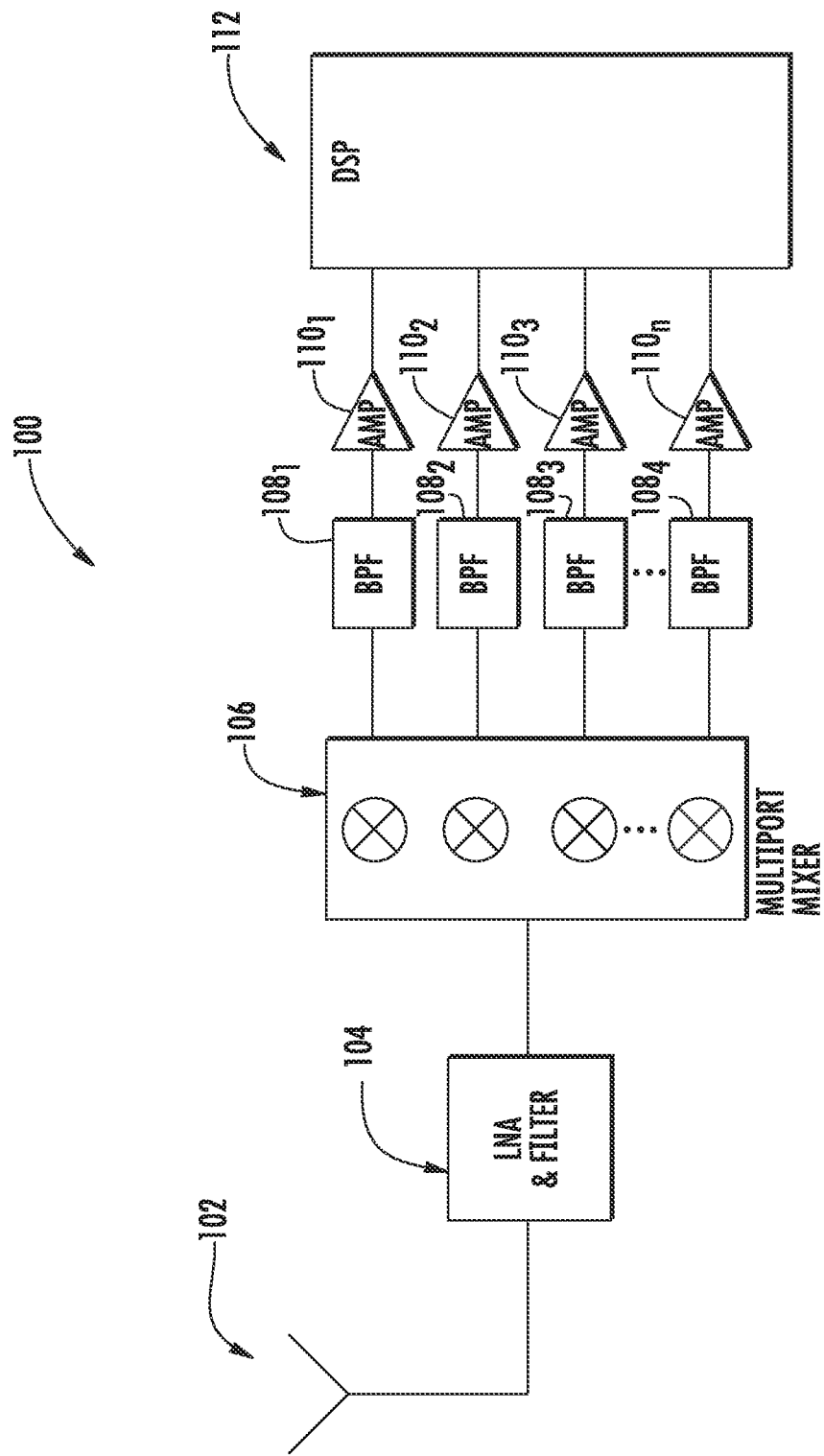
FIG. 1 is a schematic of a portion of a signal processing system in which the circuit of FIG. 2 may be incorporated.

FIG. 1 shows a schematic of RF receiver 100 incorporating a multiport mixer 106 in accordance with the present invention. A broadband composite signal carrying numerous sub-channels near or around a center frequency is received at antenna 102 and immediately filtered and amplified in circuit 104. The amplified signal containing a plurality of broadband RF signals is then mixed with a common local oscillator (LO) signal in multiport mixer 106 to produce a plurality of broadband intermediate frequency (IF) signals on isolated IF channels. A corresponding plurality of band pass filters $108_1$, $108_2$, $108_3$, and $108_n$ are individually tuned to pass a single and unique sub-channel on each isolated IF output channel. Each IF signal $IF_1$, $IF_2$, $IF_3$, and $IF_n$ is then amplified in a corresponding amplifier $110_1$, $110_2$, $110_3$, and $110_n$, and then digitally processed in DSP 112.

Figure 2:
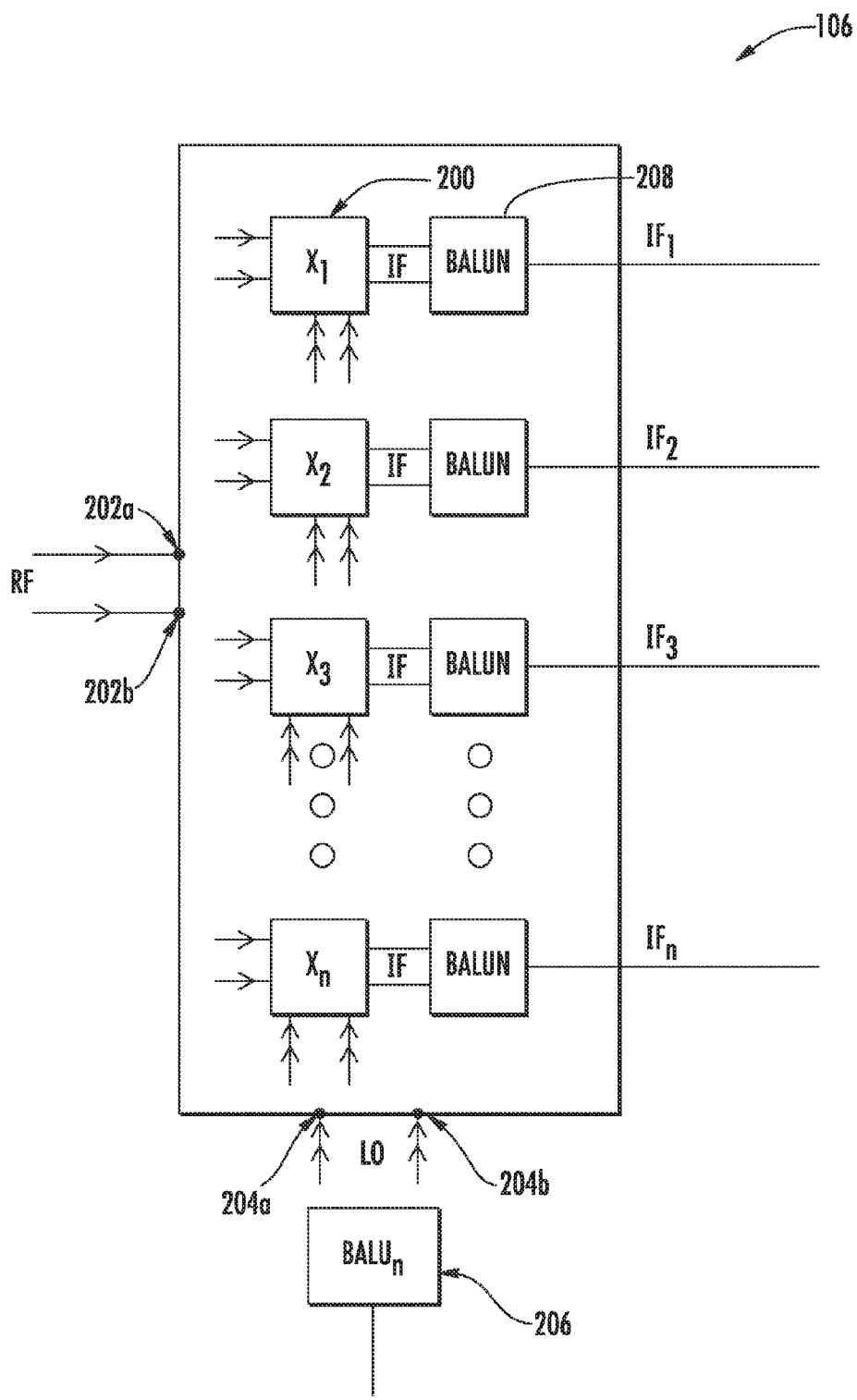
FIG. 2 is a schematic diagram of a multiport mixer for mixing and splitting channels on a broadband composite RF signal in accordance with the present invention.

FIG. 2 shows a schematic of multiport mixer 106. One skilled in the art would recognize that receiver 100 is only one application for multiport mixer 106 and that there are a multitude of signal processing functions that may be preformed depending upon the desired application of multiport mixer 106. Multiport mixer 106 has a plurality of individual mixers $200_1$, $200_2$, $200_3$, and $200_n$ that have high impedance RF input ports regardless of their bias state. Mixers $200_1$, $200_2$, $200_3$, and $200_n$ also have broadband impedance matching circuits to match the RF input ports to RF Receiver 100. Because RF input impedance is large and independent of its bias state multiple mixers $200_1$, $200_2$, $200_3$, and $200_n$ remain independent regardless of the configuration of Multiport mixer 106. Advantageously, mixers $200_1$, $200_2$, $200_3$, and $200_n$ also have broadband high impedance buffered LO ports with broadband impedance matching to the common LO port that minimize the impact to the LO drive power requirements regardless of the number of isolated IF channels being produced. RF differential input port and LO differential input port for mixers $200_1$, $200_2$, $200_3$, and $200_n$ are connected at respective input ports 202a, 202b and 204a, 204b, respectively. Reverse isolation is provided to minimize the effect mixers $200_1$, $200_2$, $200_3$, and $200_n$ have on each other. For example, when out of band impedances of high Q external filters in receiver 100 attempt to influence adjacent output paths, reverse isolation inhibits the ability of signals on the output ports of mixers $200_1$, $200_2$, $200_3$, and $200_n$ from interacting with signals on the common RF input ports of the other mixers $200_1$, $200_2$, $200_3$, and $200_n$. Each mixer $200_1$, $200_2$, $200_3$, and $200_n$ receives a common broadband RF signal and mixes it with common LO signal to produce a common mixed broadband IF signal carrying numerous sub-channels over a large frequency range.

The common mixed broadband IF signals are received by a corresponding active IF balun $208_1$, $208_2$, $208_3$, and $208_n$ (balanced to unbalanced signal converters, or vice-versa) and converted to common single-ended unbalanced broadband mixed signals. IF balun $208_1$, $208_2$, $208_3$, and $208_n$ also provide reverse isolation from the external circuitry. These signals are received by corresponding bandpass filters $108_1$, $108_2$, $108_3$, and $108_n$ to strip off the unwanted components, so all that remains are IF signals $IF_1$, $IF_2$, $IF_3$, and $IF_n$ uniquely tuned to individual sub-channels.

LO drive 206 is an active LO balun 206 that converts a single-ended LO signal to a differentially balanced LO signal for mixing in mixers $200_1$, $200_2$, $200_3$, and $200_n$. LO balun 206 is adapted to drive parallel mixers $200_1$, $200_2$, $200_3$, and $200_n$ because each mixer $200_1$, $200_2$, $200_3$, and $200_n$ has its own high impedance LO signal buffer stage to maintain its high impedance independent of its bias condition.

Multiport mixer 106 gives the radio operator the ability to conserve power by suppressing one or more IF signals $IF_1$, $IF_2$, $IF_3$, and $IF_n$ by switching off corresponding active IF baluns $208_1$, $208_2$, $208_3$, and $208_n$, and turning off the mixer in front of the balun. Active IF baluns $208_1$, $208_2$, $208_3$, and $208_n$ and their corresponding mixers $200_1$, $200_2$, $200_3$, and $200_n$ maintain high impedance, even when one or more of active IF balun $208_1$, $208_2$, $208_3$, and $208_n$ are suppressed. The output signal strength of the remaining isolated IF channels is substantially unaffected. The high impedance of the active IF baluns $208_1$, $208_2$, $208_3$, and $208_n$ and their corresponding mixers $200_1$, $200_2$, $200_3$, and $200_n$ also allows the radio operator to tune the bias of mixers $200_1$, $200_2$, $200_3$, and $200_n$ without affecting signal strength of the other isolated IF channels. The radio operator has the flexibility to dynamically control which channels send information by adjusting the bias or suppressing the channel altogether without interfering with the signal strength of the other isolated IF channels.

High impedance stability at the RF input of mixers $200_1$, $200_2$, $200_3$, and $200_n$ and broadband impedance matched LO input ports provide signal strength consistency of the isolated IF channels. RF Impedance at the input of mixers $200_1$, $200_2$, $200_3$, and $200_n$ remains substantially matched at 50 ohms, even when the output of one of mixers $200_1$, $200_2$, $200_3$, and $200_n$ is suppressed by suppressing its corresponding active IF balun $208_1$, $208_2$, $208_3$, and $208_n$. High impedance stability allows the designer to gang a plurality of mixers $200_1$, $200_2$, $200_3$, and $200_n$ in parallel without degrading the isolated IF channels' signal strength. Moreover, high impedance stability at the RF input port prevents the impedance across all RF input ports of mixers $200_1$, $200_2$, $200_3$, and $200_n$ from dropping precipitously when additional mixers are added in parallel. Additionally, the active nature of the mixers $200_1$, $200_2$, $200_3$, and $200_n$ provides reverse signal isolation and isolates the mixers $200_1$, $200_2$, $200_3$, and $200_n$ from each other allowing the designer to derive multiple isolated IF channels in a fraction of the area on a die when designing an integrated circuit.

Figure 3:
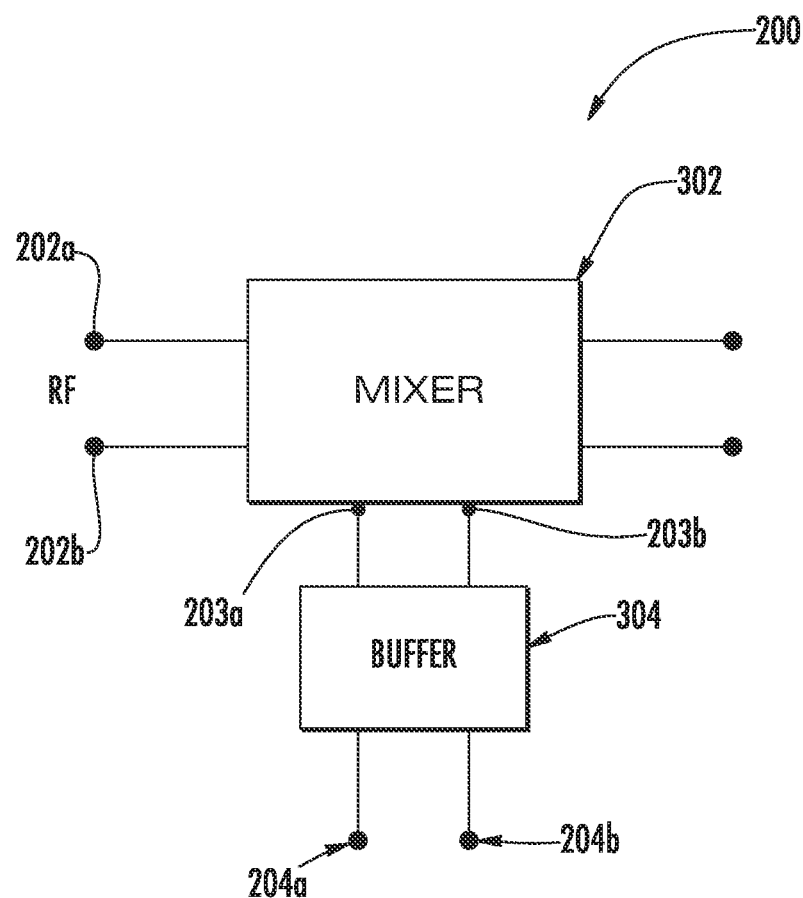
FIG. 3 is a schematic diagram of a mixer in the multiport mixer of FIG. 2.

Referring to FIG. 3, mixer 200 comprises a Gilbert Cell mixer 302 with an emitter follower buffer 304 to isolate Gilbert Cell mixer 302 from LO drive 206. Buffer 304 has a high impedance at LO input port and maintains the high impedance at LO input port regardless of the number of isolated IF channels being utilized or the bias levels of Gilbert Cell mixer 302.

In an embodiment, the circuit of FIG. 2 is operable as a method of separating individual channels from a composite broadband RF signal. Antenna 102 detects the composite broadband RF signal. The RF signal is received by multiport mixer 106. Multiport mixer 106 has a plurality of mixers $200_1$, $200_2$, $200_3$, and $200_n$ with high impedance input ports that maintain high impedance regardless of the bias state of mixer $200_1$, $200_2$, $200_3$, and $200_n$. Mixers $200_1$, $200_2$, $200_3$, and $200_n$ split the broadband RF signal into multiple parallel and isolated paths without degrading the broadband RF signal strength in any one path. The impedance of the internal mixer circuits is high, which allows a simple impedance match circuit. Impedance matching could be attained by a shunt resister or by a common base/gate transistor where the input impedance is matched to the 1/gm of the emitter/source input in order to match the impedance of the external circuit. All internal circuit interfaces are high impedance regardless of bias condition, which provides independence of conversion gain regardless of which channels are utilized or what their bias levels are.

A common LO signal is received by mixers $200_1$, $200_2$, $200_3$, and $200_n$ from a LO drive at a broadband impedance matched LO input port that remains matched independent of how many isolated IF channels are being utilized. Mixers $200_1$, $200_2$, $200_3$, and $200_n$ separately mix the broadband RF signal with the common LO signal to produce common isolated broadband. IF signals. Band pass filters 108 corresponding and individually tuned to pass a single and unique sub-channel on each isolated IF output channel strip off unwanted components of the common isolated broadband IF signal to produce a plurality of unique individual and isolated IF signals $IF_1$, $IF_2$, $IF_3$, and $IF_n$ containing unique information content. DSP 112 then process the unique individual IF signals $IF_1$, $IF_2$, $IF_3$, and $IF_n$.

Figure 4:
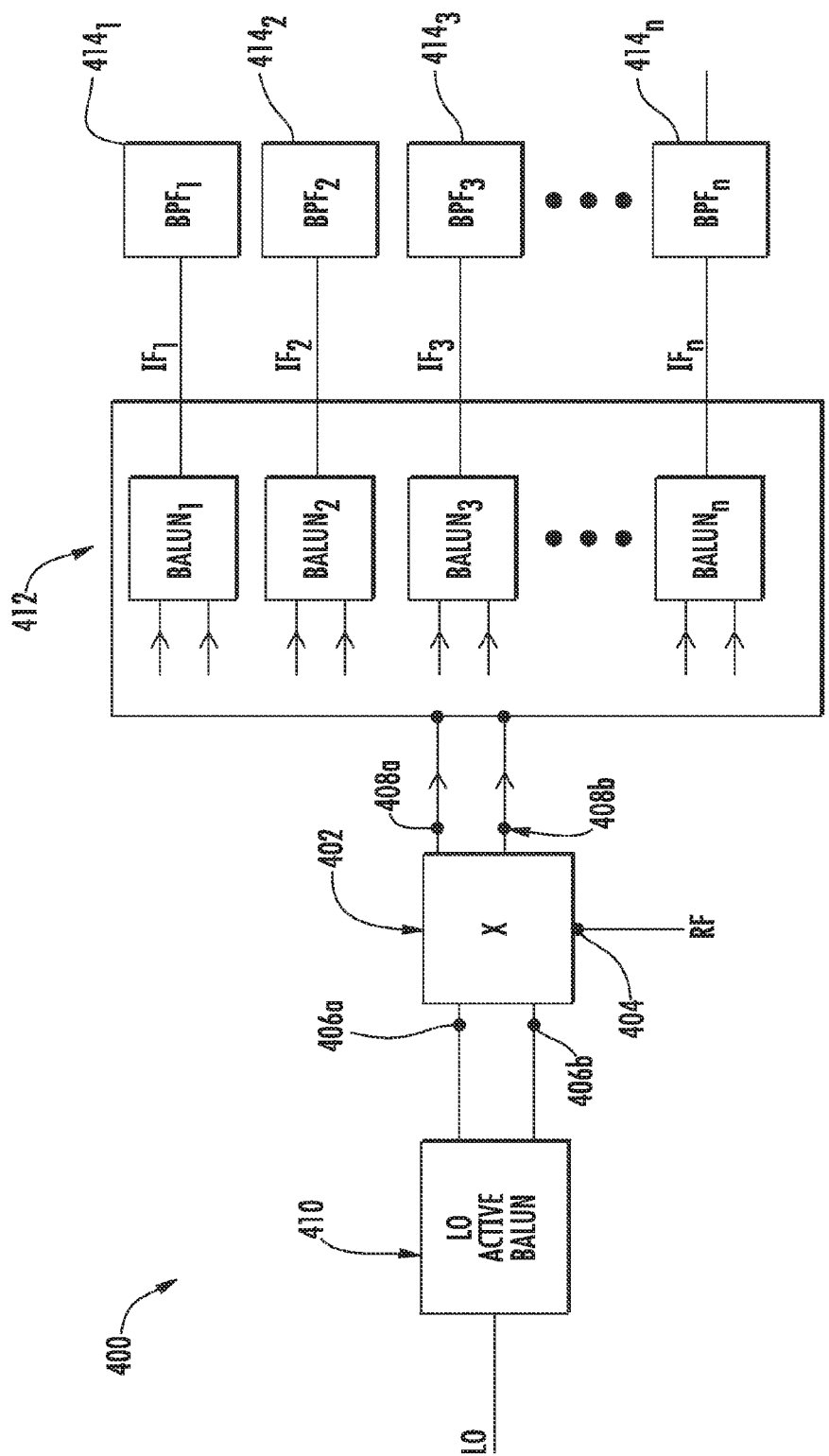
FIG. 4 is a schematic diagram of a multiport active IF balun for mixing and splitting the RF signal in accordance with an alternative embodiment of the present invention.

An alternative embodiment of a circuit for separating individual channels from a composite broadband RF signal is disclosed in FIG. 4. A highly linear high performance broadband mixer 402 receives a single ended unbalanced RF signal at input port 404. RF Input port 404 maintains a broadband matched impedance independent of the biasing of the isolated $IF_1$, $IF_2$, $IF_3$, and $IF_n$ channels that are produced by multiport IF drive 412. The unbalanced RF signal is mixed with a differentially balanced LO signal received at differential broadband impedance matched input ports 406a, 406b from LO drive 410. Input ports 406a, 406b isolate LO drive 410 form the RF and IF channels. LO drive 410 is an active balun that converts a single ended unbalanced LO signal to differentially balanced LO signal. The product of mixer 402 produced at IF output ports 408a, 408b is a differentially balanced broadband IF signal carrying a plurality of subchannels.

The differentially balanced broadband IF signal is substantially simultaneously split at a multiport active IF balun circuit 412 to produce a plurality of isolated, single-ended unbalanced broadband IF signals represented by $IF_1$, $IF_2$, $IF_3$, and $IF_n$. Each IF signal is then received by a corresponding band pass filters $414_1$, $414_2$, $414_3$, and $414_n$ to strip off the unwanted components, so all that remains are individual unique sub-channels on corresponding IF signals $IF_1$, $IF_2$, $IF_3$, and $IF_n$.

The bias and linearity of independent IF sections $IF_1$, $IF_2$, $IF_3$, and $IF_n$ are independently controllable and suppressible with minimal impact to the input or output impedance of the remaining IF sections. Multiport IF drive 412 contains a corresponding number of active IF baluns $412_1$, $412_2$, $412_3$, and $412_n$ that have large input impedances independent of their bias condition. The number of active IF baluns $412_1$, $412_2$, $412_3$, and $412_n$ is limited only by bandwidth and parasitic loadings that might degrade multiport IF drive's 412 performance. Due to the large input impedance the bias and linearity through a given isolated IF channel $IF_1$, $IF_2$, $IF_3$, and $IF_n$ is independently adjustable. This allows the radio operator the flexibility to dynamically control which channels send information by adjusting the bias or suppressing the channel altogether without interfering with the signal strength of the other isolated IF channels.

While the present invention has been particularly shown and described with reference to exemplary embodiments thereof, it should be understood by those of ordinary skill in the art that various changes, substitutions and alterations can be made herein without departing from the scope of the invention as defined by appended claims and their equivalents.

What is claimed is:

1. An RF mixer comprising:
   a plurality of subchannel mixers each having an RF input port for receiving a composite RF signal carrying a plurality of individual channels on respective frequencies, a broadband impendence matched local oscillator (LO) input port for receiving a balanced LO signal, and an output port that is isolated from the RF input port and the LO input port for providing an isolated intermediate frequency (IF) signal that is isolated from the composite RF signal and the LO signal, wherein the RF input port of each of the plurality of subchannel mixers having substantially matched impedances across all the plurality of subchannel mixers;
   a plurality of active IF baluns each being combined with the output port of one of the plurality of subchannel mixers, wherein the active IF baluns are adapted for suppressing the isolated IF signal corresponding to one of the respective subchannel mixers and maintaining the impedance matching across the plurality of subchannel mixers; and
   a plurality of filters corresponding to individual channels each tuned for passing a corresponding frequency contained in the IF signal.

2. The RF mixer of claim 1, wherein the output port of each of the plurality of subchannel mixers provides an isolated unbalanced IF signal.

3. The RF mixer of claim 2, wherein the impedance for the RF input port of each of the plurality of subchannel mixers is substantially matched.

4. The RF mixer of claim 3, wherein the impedance at the RF input port of each of the plurality of subchannel mixers is substantially matched when one or more of the plurality of subchannel mixers is suppressed.

5. The RF mixer of claim 1, wherein in each of the plurality of subchannel mixers the RF input port is isolated from the output port.

6. An RF mixer comprising:
   a mixer having an RF input port for receiving a composite RF signal carrying a plurality of individual channels on respective frequencies, a broadband impendence matched local oscillator (LO) input port for receiving a balanced LO signal, and an output port that is isolated from the RF input port and the LO input port for providing an isolated intermediate frequency (IF) signal that is isolated from the composite RF signal and the LO signal;
   a plurality of intermediate frequency (IF) baluns each corresponding to one of the plurality of individual channels, wherein each one of the plurality of IF baluns is combined with the output port of the mixer, wherein each one of the plurality of IF baluns is adapted to suppress the isolated IF signal corresponding to one of the plurality of individual channels; and
   a plurality of filters each corresponding to one of the plurality of individual channels and each being tuned for passing a corresponding frequency contained in the isolated IF signal.

7. The RF mixer of claim 6, wherein each one of the plurality of IF baluns has an output port for providing one of a plurality of isolated unbalanced IF signals corresponding to one of the plurality of the individual channels.

8. The RF mixer of claim 6, wherein an impedance for an input port of each of the plurality of IF baluns is substantially matched.

9. The RF mixer of claim 8, wherein an impedance for each input port of the plurality of IF baluns is substantially matched when one or more of the plurality of IF baluns is suppressed.

* * * * *